US012597310B2

(12) United States Patent
Fitze et al.

(10) Patent No.: US 12,597,310 B2
(45) Date of Patent: Apr. 7, 2026

(54) METHOD AND DEVICES FOR CONFIGURING ELECTRONIC LOCKS

(71) Applicant: Dormakaba Schweiz AG, Rümlang (CH)

(72) Inventors: Anthony Fitze, Pfäffikon (CH); Paul Studerus, Oberweningen (CH)

(73) Assignee: Dormakaba Schweiz AG, Rümlang (CH)

( * ) Notice: Subject to any disclaimer, the term of this patent is extended or adjusted under 35 U.S.C. 154(b) by 757 days.

(21) Appl. No.: 17/996,784

(22) PCT Filed: Apr. 21, 2021

(86) PCT No.: PCT/EP2021/060381
§ 371 (c)(1),
(2) Date: Oct. 20, 2022

(87) PCT Pub. No.: WO2021/214134
PCT Pub. Date: Oct. 28, 2021

(65) Prior Publication Data
US 2023/0154259 A1 May 18, 2023

(30) Foreign Application Priority Data
Apr. 23, 2020 (CH) .................................... 00482/20

(51) Int. Cl.
*G07C 9/00* (2020.01)

(52) U.S. Cl.
CPC ..... *G07C 9/00817* (2013.01); *G07C 9/00309* (2013.01); *G07C 2009/00825* (2013.01); *G07C 2009/00841* (2013.01)

(58) Field of Classification Search
None
See application file for complete search history.

(56) References Cited

U.S. PATENT DOCUMENTS 12,008,852 B2 * 6/2024 Burge ................ G07C 9/00817
2012/0096131 A1 4/2012 Bhandari et al.
2014/0266573 A1 9/2014 Sullivan

FOREIGN PATENT DOCUMENTS

EP 0856624 A1 8/1998
EP 3358534 A1 8/2018
WO WO 2016/185008 A1 11/2016

OTHER PUBLICATIONS

International Search Report and Written Opinion of the International Searching Authority for International Application No. PCT/EP2021/060381, mailed on Jul. 1, 2021, in 14 pages.

* cited by examiner

*Primary Examiner* — Carlos Garcia
(74) *Attorney, Agent, or Firm* — Knobbe, Martens, Olson & Bear, LLP

(57) ABSTRACT

For configuring access rights of electronic locks, a mobile communication device obtains an access right identifier. Configuration data comprising the access right identifier is transferred from the mobile communication device (3) to a first electronic lock, via a close range communication interface, thereby configuring the first electronic lock to grant an access right to electronic key devices (4) having stored thereon the access right identifier. From the mobile communication device an update request, comprising the access right identifier, is transmitted to a computer system via a communication network, enabling the computer system to transmit the access right identifier via the communication network to one or more second electronic locks for configuring the one or more second electronic locks to grant an access right to the electronic key devices having stored thereon the access right identifier.

17 Claims, 6 Drawing Sheets

METHOD AND DEVICES FOR CONFIGURING ELECTRONIC LOCKS

CROSS-REFERENCE TO RELATED APPLICATIONS

This application is the U.S. National Phase under 35 U.S.C. § 371 of International Application PCT/EP2021/060381, filed Apr. 21, 2021, which claims priority to CH Application No. 00482/20, filed Apr. 23, 2020, the entire contents of each of which are incorporated by reference herein and made a part of this specification.

FIELD OF THE DISCLOSURE

The present disclosure relates to a method and devices for configuring electronic locks. Specifically, the present disclosure relates to a method, a computer system, and computer program products for configuring access rights of electronic locks.

BACKGROUND OF THE DISCLOSURE

Methods of configuring electronic locks using a mobile communication device are known in scenarios where the electronic locks are configured to grant access to users with registered electronic key devices and thereby control access to certain areas or physical spaces restricted to the users within a building, for example. However, in buildings, in particular apartment buildings using electronic locks to control access to shared spaces and private spaces alike, the method of configuring the electronic locks faces various challenges. This is even more the case, when for controlling access to private spaces stand-alone/offline electronic locks are used, and for controlling access to shared spaces networked/online electronic locks are used. Here the challenges include synchronizing different electronic locks, such that an access right to a private space, e.g. an apartment, also allows access to certain shared spaces, e.g. the main door of the apartment building. A further challenge is the transfer of access and configuration rights, e.g. in case of a change of tenants.

Some attempts are known from the prior art to address these challenges, which are shortly described hereinafter.

EP3358534A1 first published in February of 2017, in the name of Dormakaba Deutschland GmbH, relates to a system for controlling access to a physical space within a building. The system comprises an access control server, an electronic lock for granting access to the physical space upon validation of access rights, and an administrator smartphone capable of communicating with the electronic lock and with the access control server. The administrator smartphone stores access rights readable by the electronic lock and user rights for accessing the access control server and for delegating access rights.

SUMMARY OF THE DISCLOSURE

It is an object of this disclosure to provide a method and devices for configuring access rights of electronic locks, which method and devices do not have at least some of the disadvantages of the prior art. In particular, it is an object of the present disclosure to provide a method of configuring access rights of electronic locks by means of a specifically controlled mobile communication device, a computer program product for the mobile communication device, a computer system and a computer program product for the computer system.

According to the present disclosure, these objects are achieved through the features of the independent claims. In addition, further advantageous embodiments follow from the dependent claims and the description.

According to the present disclosure, the above-mentioned objects are particularly achieved in that the method of configuring access rights of electronic locks comprises the steps of obtaining by a mobile communication device an access right identifier. Further, transferring from the mobile communication device to a first electronic lock configuration data comprising the access right identifier, via a close range communication interface, thereby configuring the first electronic lock to grant an access right to electronic key devices having stored thereon the access right identifier. In addition the method comprises the step of transmitting from the mobile communication device to a computer system via a communication network an update request, comprising the access right identifier, enabling the computer system to transmit via the communication network the access right identifier to one or more second electronic locks for configuring the one or more second electronic locks to grant an access right to the electronic key devices having stored thereon the access right identifier.

In an embodiment, the mobile communication device obtains the access right identifier by one of the following steps: generating the access right identifier in the mobile communication device, reading the access right identifier, by the mobile communication device, from an electronic key device, and/or requesting the access right identifier, by the mobile communication device, from the computer system. The requesting is done by transmitting an access right identifier request from the mobile communication device to the computer system via the communication network, and receiving the access right identifier in the mobile communication device from the computer system via the communication network.

In an embodiment, the method further comprises transmitting a delegation request for another mobile communication device, from the mobile communication device, via the communication network, to the computer system, the delegation request comprising the access right identifier, enabling the computer system to transfer the access right identifier, via the communication network, to the other mobile communication device.

In an embodiment, the method further comprises the mobile communication device obtaining a configuration right identifier by reading the configuration right identifier from an electronic master key device. Alternatively or in addition the method comprises the mobile communication device obtaining the configuration right identifier by receiving the configuration right identifier from the computer system via the communication network. In this case the update request transmitted from the mobile communication device, via the communication network, to the computer system can further comprises the configuration right identifier, enabling the computer system to transmit, via the communication network, the access right identifier to the one or more second electronic locks, using the configuration right identifier.

In an embodiment, the method further comprises transferring a configuration request from the mobile communication device, via the close range communication interface, to the first electronic lock, the configuration request comprising the configuration right identifier, enabling the first electronic lock to store, upon validation of the configuration right identifier, the access right identifier received in the configuration data from the mobile communication device.

In an embodiment, the method further comprises receiving by the first electronic lock a configuration right identifier from an electronic master key device, via the close range communication interface, and storing in the first electronic lock, upon validation of the configuration right identifier, the access right identifier received in the configuration data from the mobile communication device.

In addition to the method of configuring access rights of electronic locks, the present disclosure also relates to a computer program product comprising computer program code for controlling a processor of a mobile communication device. Preferably a computer program product comprising a non-transitory computer-readable medium having stored thereon the computer program code configured to control a processor of a mobile communication device, such that the mobile communication device performs the steps of, obtaining an access right identifier, transferring configuration data via a close range communication interface to a first electronic lock, the configuration data comprising the access right identifier, thereby configuring the first electronic lock to grant an access right to electronic key devices having stored thereon the access right identifier; and transmitting an update request via a communication network to a computer system, the update request comprising the access right identifier, enabling the computer system to transmit the access right identifier, via the communication network, to one or more second electronic locks, for configuring the one or more second electronic locks to grant an access right to the electronic key devices having stored thereon the access right identifier.

In an embodiment, the medium of the computer program product has stored thereon further computer program code configured to control the processor of the mobile communication device, such that the mobile communication device performs the steps of generating the access right identifier; reading the access right identifier from an electronic key device; or requesting the access right identifier from the computer system, by transmitting an access right identifier request to the computer system via the communication network, and receiving the access right identifier from the computer system via the communication network.

In an embodiment, the medium of the computer program product has stored thereon further computer program code configured to control the processor of the mobile communication device, such that the mobile communication device transmits a delegation request for another mobile communication device, via the communication network, to the computer system, the delegation request comprising the access right identifier, enabling the computer system to transfer the access right identifier to the other mobile communication device via the communication network.

In an embodiment, the medium of the computer program product has stored thereon further computer program code configured to control the processor of the mobile communication device, such that the mobile communication device performs the step of obtaining e a configuration right identifier by reading the configuration right identifier from an electronic master key device, and/or receiving the configuration right identifier from the computer system via the communication network. The medium of the computer program product has stored thereon further computer program code configured to control the processor of the mobile communication device, such that the mobile communication device performs the step of transmitting the update request via the communication network to the computer system, the update request further comprising the configuration right identifier, enabling the computer system to transmit the access right identifier, via the communication network, to the one or more second electronic locks, using the configuration right identifier.

In an embodiment, the medium of the computer program product has stored thereon further computer program code configured to control the processor of the mobile communication device, such that the mobile communication device performs the step of transferring a configuration request via the close range communication interface to the first electronic lock, the configuration request comprising the configuration right identifier, enabling the first electronic lock to store, upon validation of the configuration right identifier, the access right identifier received in the configuration data from the mobile communication device.

In addition to the computer program product for controlling a processor of a mobile communication device, the present disclosure also relates to a computer system for updating access rights of electronic locks. The computer system comprises one or more processors configured to perform the steps of receiving, via a communication network, an update request from a mobile communication device, the update request comprising an access right identifier, and transmitting configuration data via the communication network to one or more electronic locks, the configuration data comprising the access right identifier, thereby configuring the one or more electronic locks to grant an access right to electronic key devices having stored thereon the access right identifier.

In an embodiment, the one or more processors of the computer system are further configured to perform the steps of receiving from the mobile communication device, via a communication network, a delegation request comprising the access right identifier; and transmitting the access right identifier to another mobile communication device, via the communication network, enabling the other mobile communication device to gain access to electronic locks with the access right identifier stored thereon.

In an embodiment, the one or more processors of the computer system are further configured to perform the step of receiving the update request from the mobile communication device, via the communication network, the update request further comprising a configuration right identifier; and the computer system further comprises a memory with update assignment rules stored therein, the update assignment rules defining an assignment of the configuration right identifier to one or more electronic locks, enabling the computer system to transmit configuration data comprising the access right identifier, via the communication network, to one or more electronic locks, defined by the update assignment rules, using the configuration right identifier.

In an embodiment, the one or more processors of the computer system are further configured to perform the steps of transmitting a configuration rights identifier deletion request via a communication network to the mobile communication device, instructing the mobile communication to delete the configuration rights identifier stored thereon, and transmitting an access right identifier deletion request via the communication network to another mobile communication device, instructing the other mobile communication device to delete the access right identifier stored thereon.

In an embodiment, the one or more processors of the computer system are further configured to perform the steps of transmitting an access right identifier deletion request via the communication network to one or more electronic locks, the access right identifier deletion request comprising an access right identifier and instructing the one or more electronic locks to delete the access right identifier defined in the access right identifier deletion request.

In addition to the computer system for updating access rights of electronic locks, the present disclosure also relates to a computer program product for comprising computer program code for controlling one or more processors of a computer system. Preferably a computer program product comprising a non-transitory computer-readable medium having stored thereon the computer program code configured to control one or more processors of a computer system, such that the computer system performs the steps of receiving an update request via a communication network from a mobile communication device, the update request comprising an access right identifier, and transmitting configuration data via the communication network to one or more electronic locks, the configuration data comprising the access right identifier, thereby configuring the one or more electronic locks to grant an access right to electronic key devices having stored thereon the access right identifier.

In an embodiment, the medium of the computer program product has stored thereon further computer program code configured to control the one or more processors of a computer system, such that the computer system performs the steps of receiving from the mobile communication device, via a communication network, a delegation request comprising the access right identifier, and transmitting the access right identifier to another mobile communication device, via the communication network, enabling the other mobile communication device to gain access to electronic locks with the access right identifier stored thereon.

In an embodiment, the medium of the computer program product has stored thereon further computer program code configured to control the one or more processors of a computer system, such that the computer system performs the steps of receiving the update request from the mobile communication device, via the communication network, the update request further comprising a configuration right identifier, and the medium has stored thereon further computer program code configured to control the one or more processors to access a memory of the computer system, the memory having stored thereon update assignment rules defining an assignment of the configuration right identifier to one or more electronic locks, and to perform the step of transmitting configuration data comprising the access right identifier, via the communication network, to one or more electronic locks, defined by the update assignment rules, using the configuration right identifier.

In an embodiment, the medium of the computer program product has stored thereon further computer program code configured to control the one or more processors of a computer system, such that the computer system performs the steps of transmitting a configuration rights identifier deletion request via a communication network to the mobile communication device, the configuration rights identifier deletion request instructing the mobile communication to delete the configuration rights identifier stored thereon; and transmitting an access right identifier deletion request to another mobile communication device, via the communication network, instructing the other mobile communication device to delete the access right identifier stored thereon.

In an embodiment, the medium of the computer program product has stored thereon further computer program code configured to control the one or more processors of a computer system, such that the computer system performs the steps of transmitting an access right identifier deletion request via the communication network to one or more electronic locks, the access right identifier deletion request comprising an access right identifier and instructing the one or more electronic locks to delete the access right identifier defined in the access right identifier deletion request.

BRIEF DESCRIPTION OF THE DRAWINGS

The present disclosure will be explained in more detail, by way of example, with reference to the drawings in which.

DESCRIPTION OF THE EMBODIMENTS

Figure 1:
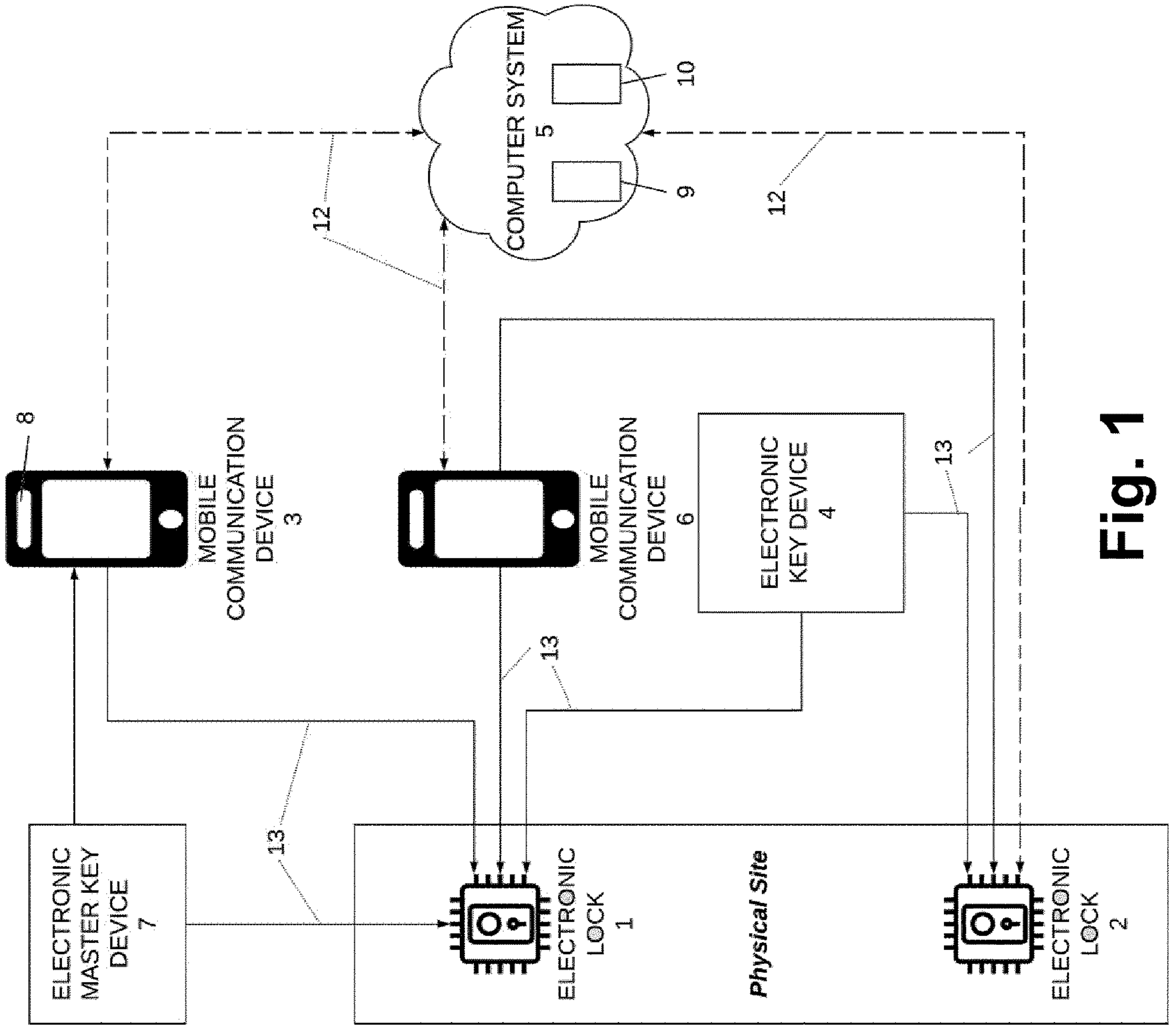
FIG. 1: shows a block diagram illustrating schematically a system for of configuring access rights of electronic locks.

FIG. 1 schematically shows a system for configuring access rights of electronic locks, the system comprising electronic locks 1 and 2, mobile communication devices 3 and 6, a computer system 5. The computer system 5 comprises one or more processors 9 as well as a memory 10. The computer system is connectable via a communication network 12 to the mobile communication devices 3 and 6, as well as to one or more second electronic locks 2. The system further comprises at least one electronic key device 4 and an electronic master key device 7.

The electronic locks 1 and 2 are typically used to control access to physical spaces or certain areas within or around a building. The electronic locks 1 and 2 are configured to receive configuration data via a close range communication interface 13 from the mobile communication device 3. There are essentially two types of electronic locks 1 and 2, wherein the first type of electronic locks 1 is configured to receive configuration data via the close range communication interface 13 and is typically configured and implemented as a stand-alone or off-line device. The second type of electronic locks 2 is configured to alternatively or in addition receive configuration data via a communication network 12, as shown in FIG. 1, and is typically configured and implemented as a connected or on-line device.

The mobile communication devices 3 and 6 comprise a mobile radio telephone (i.e. a cellular phone), a tablet or notebook computer, a computerized watch, and/or another mobile communication device. As illustrated schematically in FIG. 1, the mobile communication device 3 and 6 each comprise a processor 8 and are configured to exchange data with the computer system 5 via the communication network 12. The mobile communication devices 3, 6 are further configured to exchange data with the first electronic lock 1, the electronic key device 4, and the electronic master key device 7 via a close range communication interface 13. Specifically, the mobile communication device 3, 6 is configured to transfer data to and read data from the first electronic lock 1, the electronic key device 4, and the electronic master key device 7 via the close range communication interface 13. More specifically, the mobile communication device 3, 6 is further configured to read a configuration right identifier from the electronic master key device 7 and to read an access right identifier from the electronic key device 4.

In the exemplary situation of the apartment building described in the background section, the system would comprise an electronic master key device 7 per tenant, allowing each tenant to configure the first electronic locks 1 controlling the access to their respective apartment. In this context a combination of stand-alone and connected electronic locks 1, 2 is advantageous, as an ease of use and administration is provided, while satisfying legal or contractual requirements of tenants controlling the configuration of the electronic locks 1 to their apartments.

The computer system 5 is implemented as a local computer system 5 arranged within the building or in close proximity to the building, or as a remote computer system 5. The computer system 5 comprises one or more processors 9 and at least one memory 10 connected to the one or more processors, as schematically displayed in FIG. 1. The computer system 5 is configured to receive configuration data from a mobile communication device 3 and to forward this configuration data to one or more second electronic locks 2 via the communication network 12.

The electronic key devices 4 and the electronic master key device 7 are implemented as an electronic key card, a smart/hybrid key or an electronic key. The electronic key devices 4 and the electronic master key device 7 are configured to transmit data stored thereon via a close range communication interface 13 to be received by an electronic lock 1, 2, or by a mobile communication device 3, 6.

The communication network 12 comprises a mobile radio network, such as GSM (Global System for Mobile Communication), UMTS (Universal Mobile Telephone System), WLAN (Wireless Local Area Network) or the like. As indicated in FIG. 1, optionally, the communication network comprises a wire based network, such as provided by LAN (Local Area Network), an Ethernet connection or an USB connection or the like, and/or the Internet.

The close range communication interface 13 is implemented as a radio-based communication interface, such as RFID communication interfaces (Radio Frequency Identifier), so called NFC interfaces (Near Field Communication), optical interfaces like infrared or visual communication interfaces, or Bluetooth communication interfaces. Preferred however are communication interfaces having a range of less than 2 meters, 1 meter or 30 centimeters.

In the following paragraphs, described with reference to FIGS. 2 to 6 are possible sequences of steps performed in order to configure the electronic locks 1 and 2.

Figure 2:
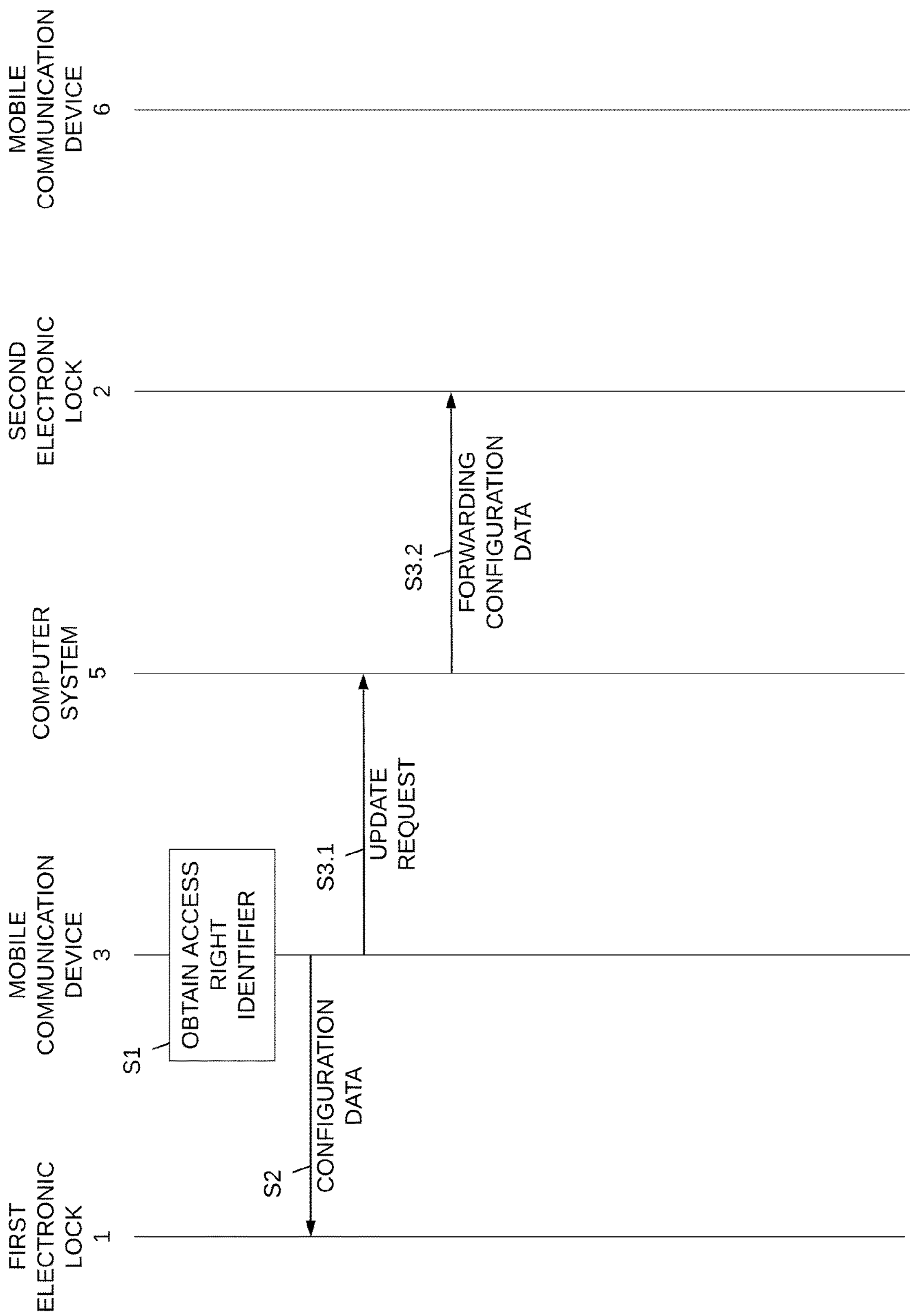
FIG. 2: shows a timing diagram illustrating an exemplary sequence of steps for configuring access rights of electronic locks.

Step S1, as shown in FIG. 2, is performed by the mobile communication device 3 and relates to obtaining an access right identifier by the mobile communication device 3. In a first variation the mobile communication device 3 obtains the access right identifier by reading in step S1 the access right identifier from the electronic key device 4. Possible implementations comprise capturing in step S1, by the mobile communication device 3, the access right identifier from the electronic key device 4, visually displaying the access right identifier. Alternatively, or in addition, the mobile communication device 3 obtains the access right identifier, by generating in step S1 the access right identifier. Optionally the mobile communication device 3 obtains the access right identifier, by requesting in step S1 from the computer system 5 the access right identifier. The requesting is done by transmitting an access right identifier request from the mobile communication device 3 to the computer system 5, via the communication network 12, and receiving in the mobile communication device 3 from the computer system 5, via the communication network 12, the access right identifier.

Once the mobile communication device 3 has obtained in step S1 the access right identifier, it can transfer in step S2 configuration data comprising the access right identifier to the first electronic lock 1, via a close range communication interface 13, as shown in FIG. 2. The first electronic lock 1 is thereby configured to grant an access right to electronic key devices 4 having stored thereon the access right identifier. For that purpose, the user of the mobile communication device 3 physically moves the mobile communication device 3 into the close range of the first electronic lock 1, as defined by the close range communication interface specifications.

In order only allow a configuration of the first electronic lock 1, upon validation of a configuration right identifier stored on a physically present electronic master key device 7, performed are the steps described in the following paragraphs.

Figure 6:
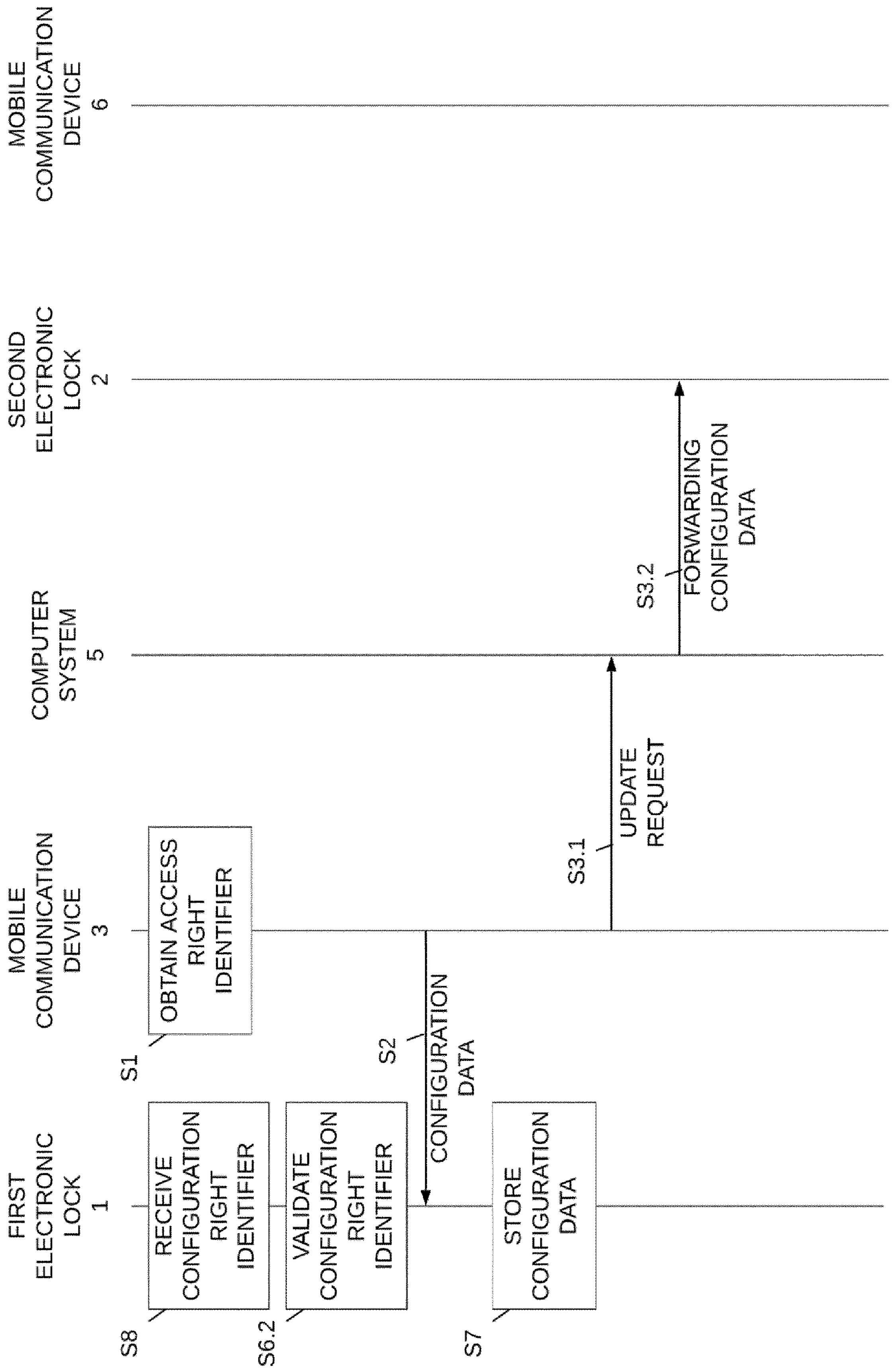
FIG. 6: shows a timing diagram illustrating an exemplary sequence of steps for configuring access rights of an electronic lock with an authorization step prior to the configuration.

In an embodiment shown in FIG. 6, the first electronic lock 1 receives in step S8 the configuration right identifier from the electronic master key device 7, via the close range communication interface 13, and stores in step S7 in the first electronic lock 1, upon validation in step S6.2 of the configuration right identifier, the access right identifier received in step S2 in the configuration data from the mobile communication device 3.

Figure 5:
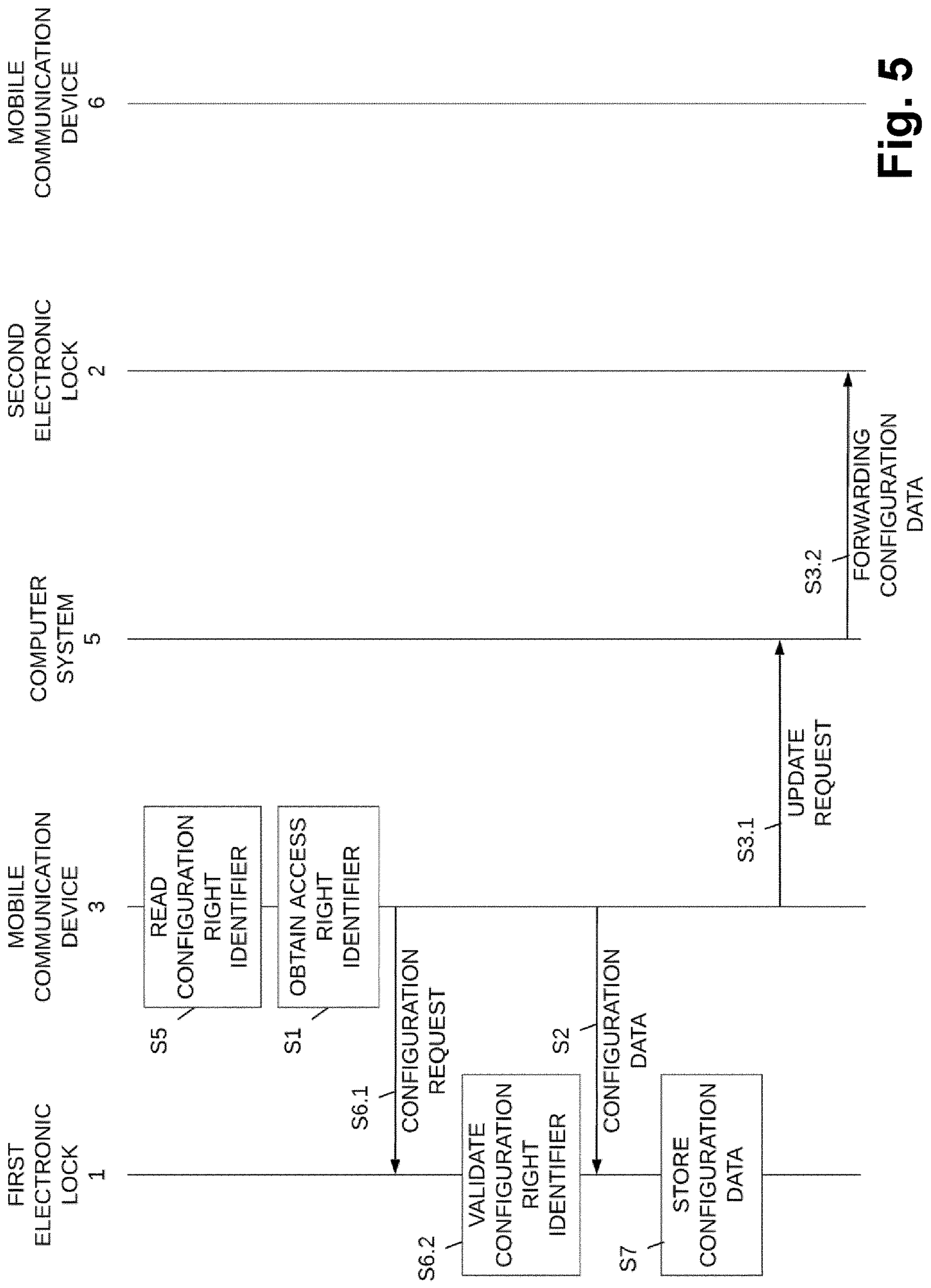
FIG. 5: shows a timing diagram illustrating an exemplary sequence of steps for configuring access rights of an electronic lock with an authorization step prior to the configuration.

In another embodiment, as shown in FIG. 5, the first electronic lock 1 receives in step S8 the configuration right identifier from the mobile communication device 3, via the close range communication interface 13, and, upon validation of the configuration right identifier in step S6.2, stores in the first electronic lock 1 in step S7, the access right identifier, received in the configuration data from the mobile communication device 3 in step S2. The mobile communication device 3, in this case beforehand, obtains in step S5 the configuration right identifier, either by reading in step S5.1 the configuration right identifier from the electronic master key device 7, or by receiving in step S5.2 the configuration rights identifier from the computer system 5, via the communication network 12. In the variation in which the mobile communication device 3 receives in step S5.2 the configuration rights identifier from the computer system 5, via the communication network 12, the presence of an electronic master key device 7 can be omitted. In other words, the electronic master key device 7 is virtualized and the configuration rights identifier is stored in the mobile communication device 3, in this case.

In step S6.1, the mobile communication device 3 transfers a configuration request comprising the configuration right identifier, to the first electronic lock 1, enabling the first electronic lock 1 to store in step S7, upon validation of the configuration right identifier, the access right identifier received in the configuration data from the mobile communication device 3 in step S2.

In case the mobile communication device 3 transfers in step S2 configuration data to the first electronic lock 1, the mobile communication device 3 additionally transmits in step S3.1 via a communication network 12 an update request to a computer system 5, as shown in FIG. 2. The update request comprises the access right identifier, enabling the computer system 5 to transmit in step S3.2 via the communication network 12 the access right identifier to one or more second electronic locks 2, for configuring the one or more second electronic locks 2 to grant an access right to the electronic key devices 4 having stored thereon the access right identifier. This way the first electronic lock 1 and the one or more second electronic locks 2 grant an access right to the same electronic key devices 4, providing a synchronization of the one or more second electronic locks 2, based on the configuration of the first electronic lock 1. Referring back to the example mentioned in the introduction, the first electronic lock may be used for controlling access to the private space of a tenant and the one or more electronic locks 2 may be used for controlling access to shared spaces like the main entrance of the apartment building. In case the tenant uses the mobile communication device 3 to configure the first electronic lock 1 to grant access to a specific electronic key device 4, due to the synchronization, the same electronic key device 4 will be granted access by the second electronic lock 2.

Figure 3:
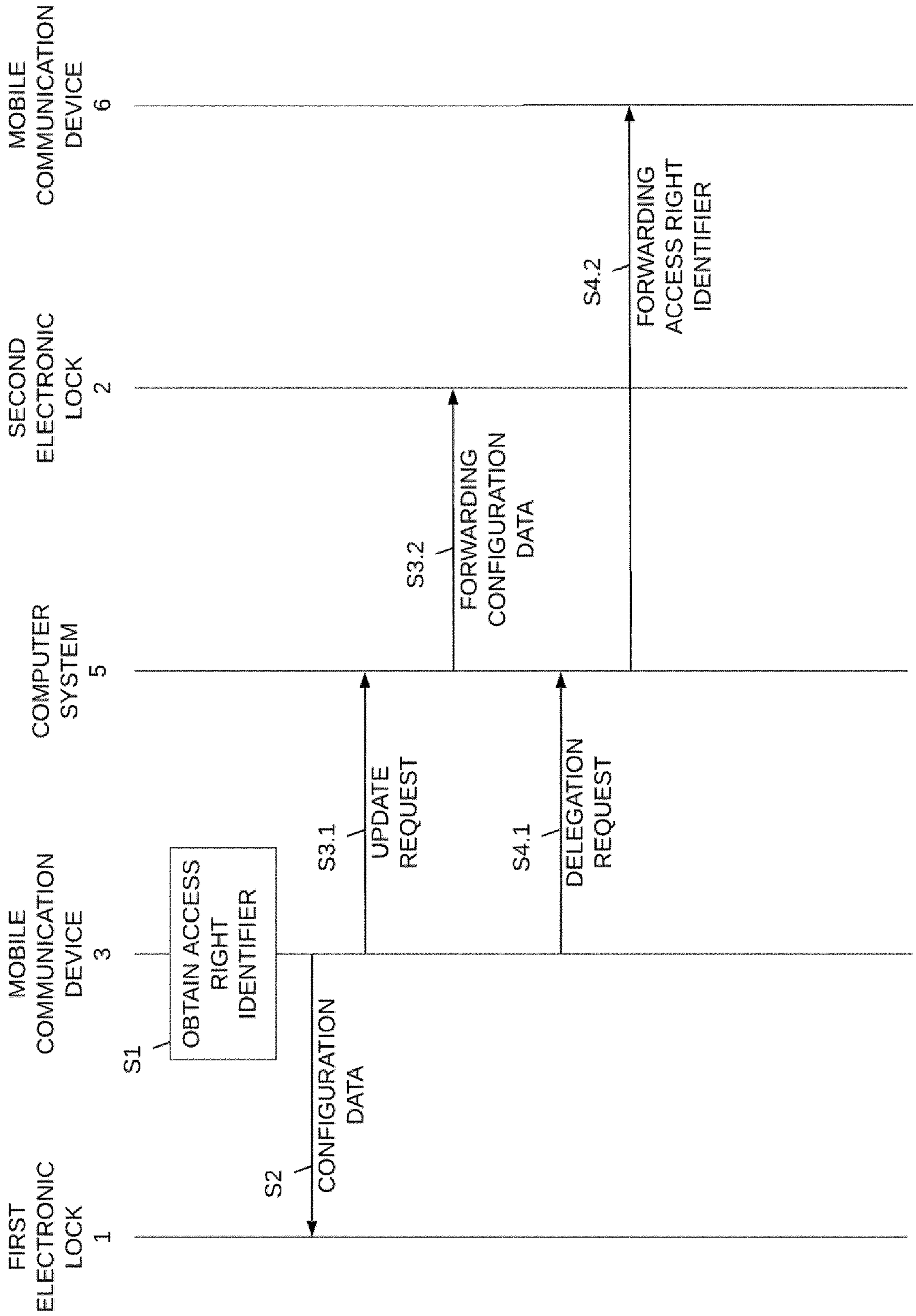
FIG. 3: shows a timing diagram illustrating an exemplary sequence of steps for configuring access rights of electronic locks and for delegating access rights to one or more mobile communication devices.

In an embodiment shown in FIG. 3, the mobile communication device 3 further transmits in step S4.1 via the communication network 12 a delegation request to the computer system 5. The delegation request comprises an access right identifier, for another mobile communication device 6, enabling the computer system 5 to transfer in step S4.2 the access right identifier to the other mobile communication device 6, via the communication network 12. Depending on the configuration or scenario, the delegation request further comprises information related to the other mobile communication device 6 or the user thereof, enabling the computer system 5 to forward the access rights identifier from the delegation request, based on the information received in the delegation request. The delegation request optionally further comprises a validity time, such that the mobile communication device is enabled to limit the time within which the access right identifier is usable. This way sharing access rights to a space controlled by the respective electronic locks 1 and/or 2 with a second user can be limited in time. For example, if a janitor of the apartment building requires access to a certain apartment, the tenant of that apartment can share the access, as described above, using the mobile communication device 3 for a limited period of time.

Figure 4:
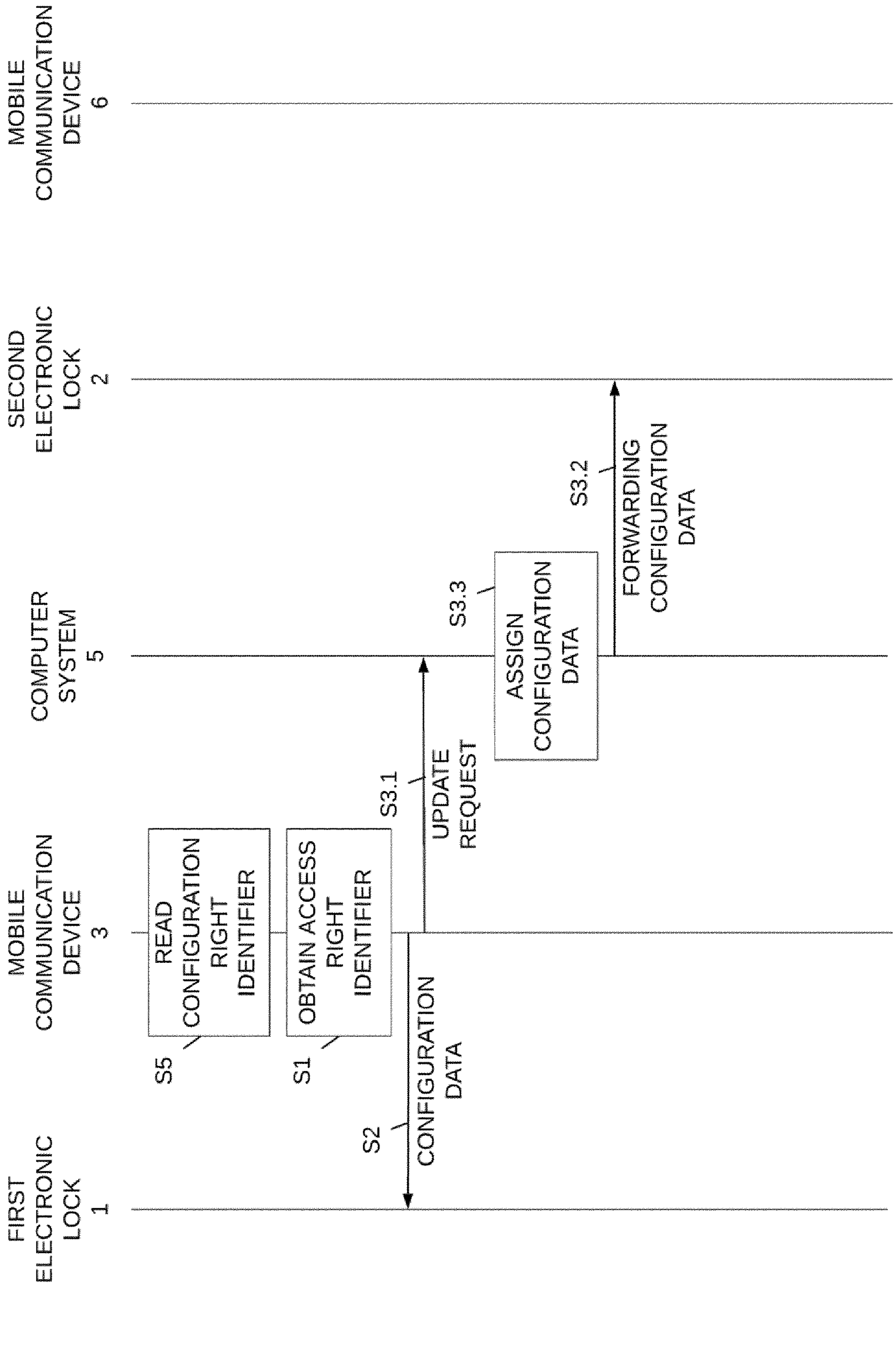
FIG. 4: shows a timing diagram illustrating an exemplary sequence of steps for configuring access rights of electronic locks and forwarding the configuration to a predefined set of electronic locks.

For the computer system 5 to forward the access rights identifier included in the update request, the computer system has stored in memory 10 update assignment rules which define assignments of the configuration right identifier to one or more electronic locks 2. As shown in FIG. 4, based on the update assignment rules, the computer system assigns in step S3.3 the configuration data received in the update request to one or more second electronic locks 2. This enables the computer system 5 to transmit in step S3.2 configuration data comprising the access right identifier, via the communication network 12, to one or more electronic locks 2, defined by the update assignment rules, using the configuration right identifier. In terms of the previously described exemplary use case of an apartment building, the update assignment rules can be defined, e.g. by the landlord or the administrator of said building, according to agreements with the tenants. For example, if a tenant in addition to an apartment also rents a parking space, then the configuration of the first electronic lock 1 controlling access to the tenant's apartment will be synchronized according to the update assignment rules to the one or more second electronic locks 2 controlling the access to the parking space.

Another aspect of the disclosure becomes apparent, when configuring access such that some access right identifiers are not granted an access right anymore, for example if an access right shall be revoked, which was previously forwarded to another mobile communication device 6 through a delegation request.

In an embodiment the one or more processors 13 of the computer system 5 are further configured to perform the steps of transmitting from the computer system 5 to the mobile communication device 6 a configuration rights identifier deletion request via a communication network 12, instructing the mobile communication device 6 to delete the configuration rights identifier stored thereon and transmitting from the computer system 5 an access right identifier deletion request to another mobile communication device 6, via the communication network 12, instructing the other mobile communication device 6 to delete the access right identifier stored thereon.

In an embodiment the one or more processors 13 of the computer system 5 are further configured to perform the steps transmitting from the computer system 5 to one or more electronic locks 2 an access right identifier deletion request comprising an access right identifier, via the communication network 12, instructing the one or more electronic locks 2 to delete the access right identifier received in the access right identifier deletion request stored on the one or more electronic locks 2 and being thereby configured to not grant access for electronic key devices 4 having stored thereon only the access right identifier received in the access right identifier deletion request.

It should be noted that, in the description, the sequence of the steps has been presented in a specific order, one skilled in the art will understand, however, that the order of at least some of the steps could be altered, without deviating from the scope of the disclosure.

REFERENCE NUMERALS

1 First electronic lock
2 Second electronic lock
3 Mobile communication device
4 Electronic key device
5 Computer system
6 Mobile communication device
7 Electronic master key device
8 Processor (mobile communication device)
9 Processor (computer system)
10 Memory (computer system)
12 Communication network
13 Close range communication interface

What is claimed is:

1. A method of configuring access rights of electronic locks, the method comprising:

obtaining by a mobile communication device an access right identifier;

transferring from the mobile communication device to a first electronic lock configuration data comprising the access right identifier, via a close range communication interface, thereby configuring the first electronic lock to grant an access right to electronic key devices having stored thereon the access right identifier;

transmitting from the mobile communication device to a computer system via a communication network an update request, comprising the access right identifier; and transmitting by the computer system via the communication network, the access right identifier to one or more second electronic locks for configuring the one or more second electronic locks to grant an access right to the electronic key devices having stored thereon the access right identifier, thereby synchronizing the one or more second electronic locks based on the configuration of the first electronic lock.

2. The method according to claim 1, wherein the mobile communication device obtains the access right identifier by at least one of the following steps:

generating the access right identifier in the mobile communication device;

reading, by the mobile communication device, the access right identifier from an electronic key device; or requesting, by the mobile communication device, from the computer system the access right identifier, by transmitting an access right identifier request to the computer system via the communication network, and receiving in the mobile communication device from the computer system, via the communication network, the access right identifier.

3. The method according to claim 1, wherein the method further comprises transmitting a delegation request for another mobile communication device, from the mobile communication device, via the communication network, to the computer system, the delegation request comprising the access right identifier, enabling the computer system to transfer the access right identifier, via the communication network, to the other mobile communication device.

4. The method according to claim 1, wherein the method further comprises:

obtaining, by the mobile communication device, a configuration right identifier by at least one of the following steps:

reading, by the mobile communication device, the configuration right identifier from an electronic master key device; or receiving the configuration right identifier in the mobile communication device from the computer system via the communication network; and transmitting the update request from the mobile communication device, via the communication network, to the computer system, the update request further comprising the configuration right identifier, enabling the computer system to transmit, via the communication network, the access right identifier to the one or more second electronic locks, using the configuration right identifier.

5. The method according to claim 4, wherein the method comprises transferring a configuration request from the mobile communication device, via the close range communication interface, to the first electronic lock, the configuration request comprising the configuration right identifier, enabling the first electronic lock to store, upon validation of the configuration right identifier, the access right identifier received in the configuration data from the mobile communication device.

6. The method according to claim 1, wherein the method further comprises:

receiving by the first electronic lock a configuration right identifier from an electronic master key device, via the close range communication interface; and storing in the first electronic lock, upon validation of the configuration right identifier, the access right identifier received in the configuration data from the mobile communication device.

7. A computer program product comprising a non-transitory computer-readable medium having stored thereon computer program code configured to control a processor of a mobile communication device, such that the mobile communication device performs the steps of:

obtaining an access right identifier;

transferring configuration data via a close range communication interface to a first electronic lock, the configuration data comprising the access right identifier, thereby configuring the first electronic lock to grant an access right to electronic key devices having stored thereon the access right identifier; and transmitting an update request via a communication network to a computer system, the update request comprising the access right identifier, instructing the computer system to transmit the access right identifier, via the communication network, to one or more second electronic locks, for configuring the one or more second electronic locks to grant an access right to the electronic key devices having stored thereon the access right identifier, thereby synchronizing the one or more second electronic locks based on the configuration of the first electronic lock.

8. The computer program product according to claim 7, wherein the medium has stored thereon further computer program code configured to control the processor of the mobile communication device, such that the mobile communication device performs the steps of:

generating the access right identifier;

reading the access right identifier from an electronic key device; or requesting the access right identifier from the computer system, by transmitting an access right identifier request to the computer system via the communication network, and receiving the access right identifier from the computer system via the communication network.

9. The computer program product according to claim 7, wherein the medium has stored thereon further computer program code configured to control the processor of the mobile communication device, such that the mobile communication device transmits a delegation request for another mobile communication device, via the communication network, to the computer system, the delegation request comprising the access right identifier, enabling the computer system to transfer the access right identifier to the other mobile communication device via the communication network.

10. The computer program product according to claim 7, wherein the medium has stored thereon further computer program code configured to control the processor of the mobile communication device such that the mobile communication device performs the step of:

obtaining a configuration right identifier by at least one of the following steps:

reading the configuration right identifier from an electronic master key device; or receiving the configuration right identifier from the computer system via the communication network; and transmitting the update request via the communication network to the computer system, the update request further comprising the configuration right identifier, enabling the computer system to transmit the access right identifier, via the communication network, to the one or more second electronic locks, using the configuration right identifier.

11. The computer program product according to claim 10, wherein the medium has stored thereon further computer program code configured to control the processor of the mobile communication device, such that the mobile communication device performs the step of transferring a configuration request via the close range communication interface to the first electronic lock, the configuration request comprising the configuration right identifier, enabling the first electronic lock to store, upon validation of the configuration right identifier, the access right identifier received in the configuration data from the mobile communication device.

12. A computer system for updating access rights of electronic locks, the computer system comprising one or more processors, configured to perform the steps of:

receiving, via a communication network, an update request from a mobile communication device, the update request comprising an access right identifier obtained by the mobile communication device and transferred by the mobile communication device to a first electronic lock; and transmitting configuration data via the communication network to one or more second electronic locks, the configuration data comprising the access right identifier, thereby configuring the one or more electronic locks to grant an access right to electronic key devices having stored thereon the access right identifier, thereby synchronizing the one or more second electronic locks based on the configuration of the first electronic lock.

13. The computer system according to claim 12, wherein the one or more processors are further configured to perform the steps of:

receiving from the mobile communication device, via a communication network, a delegation request comprising the access right identifier; and transmitting the access right identifier to another mobile communication device, via the communication network, enabling the other mobile communication device to gain access to electronic locks with the access right identifier stored thereon.

14. The computer system according to claim 12, wherein the one or more processors are further configured to perform the step of receiving the update request from the mobile communication device, via the communication network, the update request further comprising a configuration right identifier, and the computer system further comprises a memory with update assignment rules stored therein, the update assignment rules defining an assignment of the configuration right identifier to one or more electronic locks, enabling the computer system to transmit configuration data comprising the access right identifier, via the communication network, to one or more electronic locks, defined by the update assignment rules, using the configuration right identifier.

15. A computer program product comprising a non-transitory computer-readable medium having stored thereon computer program code configured to control one or more processors of a computer system such that the computer system performs the steps of:

receiving, via a communication network, an update request from a mobile communication device, the update request comprising an access right identifier obtained by the mobile communication device and transferred by the mobile communication device to a first electronic lock; and transmitting configuration data via the communication network to one or more second electronic locks, the configuration data comprising the access right identifier, thereby configuring the one or more electronic locks to grant an access right to electronic key devices having stored thereon the access right identifier, thereby synchronizing the one or more second electronic locks based on the configuration of the first electronic lock.

16. The computer program product according to claim 15, wherein the medium has stored thereon further computer program code configured to control the one or more processors of the computer system such that the computer system performs the steps of:

receiving from the mobile communication device, via a communication network, a delegation request comprising the access right identifier; and transmitting the access right identifier to another mobile communication device, via the communication network, enabling the other mobile communication device to gain access to electronic locks with the access right identifier stored thereon.

17. The computer program product according to claim 15, wherein the medium has stored thereon further computer program code configured to control the one or more processors of the computer system such that the computer system performs the steps of receiving the update request from the mobile communication device, via the communication network, the update request further comprising a configuration right identifier, and the medium has stored thereon further computer program code configured to control the one or more processors to access a memory of the computer system, the memory having stored thereon update assignment rules defining an assignment of the configuration right identifier to one or more electronic locks, and to perform the step of transmitting configuration data comprising the access right identifier, via the communication network, to one or more electronic locks, defined by the update assignment rules, using the configuration right identifier.

* * * * *